(12) United States Patent
Baldwin

(10) Patent No.: US 9,627,666 B2
(45) Date of Patent: Apr. 18, 2017

(54) BATTERY PACK FILTERING DEVICE AND METHOD

(71) Applicant: FORD GLOBAL TECHNOLOGIES, LLC, Dearborn, MI (US)

(72) Inventor: Christopher Steven Baldwin, Royal Oak, MI (US)

(73) Assignee: Ford Global Technology, LLC, Dearborn, MI (US)

( * ) Notice: Subject to any disclaimer, the term of this patent is extended or adjusted under 35 U.S.C. 154(b) by 2 days.

(21) Appl. No.: 14/742,654

(22) Filed: Jun. 17, 2015

(65) Prior Publication Data

US 2016/0372726 A1    Dec. 22, 2016

(51) Int. Cl.
| | |
|---|---|
| *H01M 2/36* | (2006.01) |
| *H01M 2/12* | (2006.01) |
| *H01M 2/10* | (2006.01) |
| *H01M 2/14* | (2006.01) |
| *H01M 2/02* | (2006.01) |

(52) U.S. Cl.
CPC .......... *H01M 2/12* (2013.01); *H01M 2/1205* (2013.01); *H01M 2/0217* (2013.01); *H01M 2/1016* (2013.01); *H01M 2/1077* (2013.01); *H01M 2/1083* (2013.01); *H01M 2/1094* (2013.01); *H01M 2/14* (2013.01); *H01M 2220/20* (2013.01)

(58) Field of Classification Search
CPC ............. H01M 2/0217; H01M 2/1016; H01M 2/1077; H01M 2/1083; H01M 2/1094; H01M 2/1205
See application file for complete search history.

(56) References Cited

U.S. PATENT DOCUMENTS

| | | |
|---|---|---|
| 8,247,097 B1 | 8/2012 | Duff et al. |
| 8,876,947 B2 | 11/2014 | Reitzle et al. |
| 2010/0136402 A1 | 6/2010 | Hermann et al. |
| 2012/0315517 A1 | 12/2012 | Duff et al. |
| 2013/0252043 A1 | 9/2013 | Allison |
| 2014/0079964 A1 | 3/2014 | Gless et al. |
| 2014/0152058 A1 | 6/2014 | Line et al. |
| 2014/0199566 A1* | 7/2014 | Gless ...................... H01M 2/10 429/72 |

OTHER PUBLICATIONS

Energy.gov, Q&A with Kozubal, Eric, Lab Breakthrough: Desiccant Enhanced Evaporative Air Conditioning, Interview, May 29, 2012, pp. 1-4.

* cited by examiner

*Primary Examiner* — Patrick Ryan
*Assistant Examiner* — Ben Lewis
(74) *Attorney, Agent, or Firm* — Carlson, Gaskey & Olds, P.C.

(57) ABSTRACT

An exemplary battery pack filtering device includes, among other things, a frame that provides at least one passageway to communicate air through the frame to an interior of a battery pack, a desiccant held by the frame, and a membrane configured to block liquid from communicating through the at least one passageway to the interior.

20 Claims, 5 Drawing Sheets

BATTERY PACK FILTERING DEVICE AND METHOD

TECHNICAL FIELD

This disclosure relates to reducing liquid water within an interior of a battery pack and, more particularly, to a filter that can block both liquid water and water vapor from entering the interior.

BACKGROUND

Generally, electrified vehicles differ from conventional motor vehicles because electrified vehicles are selectively driven using one or more battery-powered electric machines. Conventional motor vehicles, in contrast to electrified vehicles, are driven exclusively using an internal combustion engine. The electric machines can drive the electrified vehicles instead of, or in addition to, an internal combustion engine. Example electrified vehicles include hybrid electric vehicles (HEVs), plug-in hybrid electric vehicles (PHEVs), fuel cell vehicles (FCVs), and battery electric vehicles (BEVs).

Electrified vehicles can include battery packs to drive the battery-powered electric machines. The battery packs can consist of one or more battery arrays disposed within an interior of a protective housing. The housing typically includes one or more vent paths to permit pressure within the interior of the housing to equalize with pressure outside the interior. The vent paths provide an opening for liquid water and water vapor to enter the interior.

SUMMARY

A battery pack filtering device according to an exemplary aspect of the present disclosure includes, among other things, a frame that provides at least one passageway to communicate air through the frame to an interior of a battery pack. A desiccant is held by the frame, and a membrane is configured to block liquid from communicating through the at least one passageway to the interior.

In a further non-limiting embodiment of the foregoing device, the desiccant directly contacts the membrane.

In a further non-limiting embodiment of any of the foregoing devices, the membrane is directly secured to the frame.

In a further non-limiting embodiment of any of the foregoing devices, the membrane is permeable to water vapor and repels liquid water.

In a further non-limiting embodiment of any of the foregoing devices, the device includes a seal at an interface between the frame and a wall of the battery pack.

In a further non-limiting embodiment of any of the foregoing devices, the device includes a threaded connector to secure the frame relative to the battery pack.

In a further non-limiting embodiment of any of the foregoing devices, the threaded connector provides a portion of the passageway.

In a further non-limiting embodiment of any of the foregoing devices, at least one of the membrane or the desiccant are outside the interior of the battery pack.

In a further non-limiting embodiment of any of the foregoing devices, the membrane and the desiccant are inside the interior of the battery pack.

In a further non-limiting embodiment of any of the foregoing devices, the frame is dome-shaped.

A battery pack assembly according to another exemplary aspect of the present disclosure includes, among other things, a housing having an interior area that contains at least one battery array of an electric vehicle, and a filtering device received within a vent of the housing. A membrane of the filter blocks movement of liquid to the interior area through the vent, and a desiccant of the filter adsorbs liquid.

In a further non-limiting embodiment of the foregoing assembly, the filter is removably attachable to the housing.

In a further non-limiting embodiment of any of the foregoing assemblies, the membrane is upstream from the desiccant relative to a direction of flow through the vent into the interior area.

In a further non-limiting embodiment of any of the foregoing assemblies, the vent is configured to communicate air to and from the interior area to equalize a pressure of the interior area with a pressure outside the housing.

A method of equalizing pressure in a battery according to yet another exemplary aspect of the present disclosure includes, among other things, communicating a flow of air through a passageway in a frame to an interior of a battery pack, blocking movement of at least some liquid through the passageway using a membrane, and adsorbing at least some liquid in the passageway with a desiccant.

In a further non-limiting embodiment of the foregoing method, the method includes directly contacting the membrane with the desiccant.

In a further non-limiting embodiment of any of the foregoing methods, the membrane is upstream from the desiccant relative to the flow of air to the interior of the battery pack.

In a further non-limiting embodiment of any of the foregoing methods, the frame is removably attachable to a housing of the battery pack.

In a further non-limiting embodiment of any of the foregoing methods, the passageway comprises a plurality of apertures in the frame.

In a further non-limiting embodiment of any of the foregoing methods, the desiccant and the membrane are outside the interior.

DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure relates generally to preventing or reducing water build-up within an interior of a battery pack by blocking liquid water and adsorbing water vapor using a filter within a vent of the battery pack.

Figure 1:
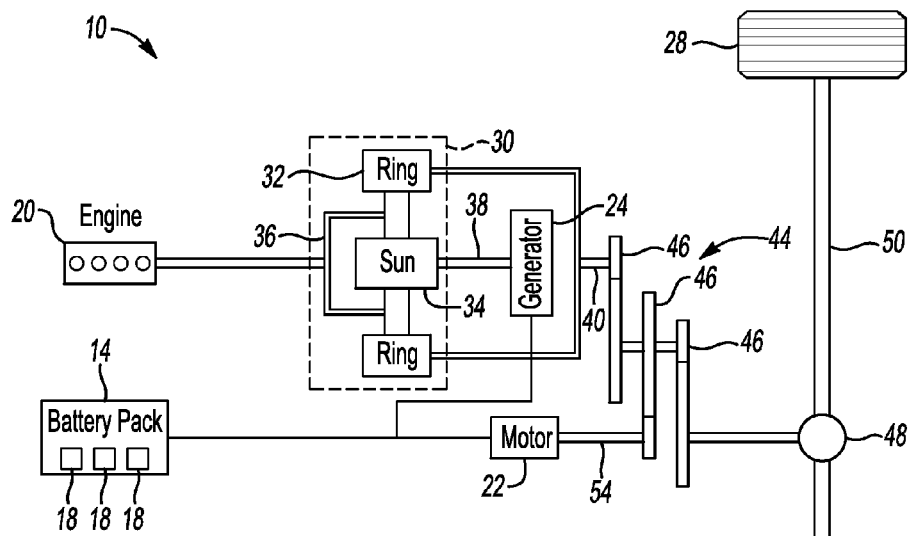
FIG. 1 shows a highly schematic view of a powertrain for an example electrified vehicle.

Referring to FIG. 1, a powertrain 10 of a hybrid electric vehicle (HEV) includes a battery pack 14 having one or more arrays 18, an internal combustion engine 20, a motor 22, and a generator 24. The motor 22 and the generator 24 are types of electric machines. The motor 22 and generator 24 may be separate or have the form of a combined motor-generator.

In this embodiment, the powertrain 10 is a power-split powertrain that employs a first drive system and a second drive system. The first and second drive systems generate torque to drive one or more sets of vehicle drive wheels 28. The first drive system includes a combination of the engine 20 and the generator 24. The second drive system includes at least the motor 22, the generator 24, and the battery pack 14. The motor 22 and the generator 24 are portions of an electric drive system of the powertrain 10.

The engine 20 and the generator 24 can be connected through a power transfer unit 30, such as a planetary gear set. Of course, other types of power transfer units, including other gear sets and transmissions, can be used to connect the engine 20 to the generator 24. In one non-limiting embodiment, the power transfer unit 30 is a planetary gear set that includes a ring gear 32, a sun gear 34, and a carrier assembly 36.

The generator 24 can be driven by the engine 20 through the power transfer unit 30 to convert kinetic energy to electrical energy. The generator 24 can alternatively function as a motor to convert electrical energy into kinetic energy, thereby outputting torque to a shaft 38 connected to the power transfer unit 30.

The ring gear 32 of the power transfer unit 30 is connected to a shaft 40, which is connected to the vehicle drive wheels 28 through a second power transfer unit 44. The second power transfer unit 44 may include a gear set having a plurality of gears 46. Other power transfer units could be used in other examples.

The gears 46 transfer torque from the engine 20 to a differential 48 to ultimately provide traction to the vehicle drive wheels 28. The differential 48 may include a plurality of gears that enable the transfer of torque to the vehicle drive wheels 28. In this example, the second power transfer unit 44 is mechanically coupled to an axle 50 through the differential 48 to distribute torque to the vehicle drive wheels 28.

The motor 22 can be selectively employed to drive the vehicle drive wheels 28 by outputting torque to a shaft 54 that is also connected to the second power transfer unit 44. In this embodiment, the motor 22 and the generator 24 cooperate as part of a regenerative braking system in which both the motor 22 and the generator 24 can be employed as motors to output torque. For example, the motor 22 and the generator 24 can each output electrical power to recharge cells of the battery pack 14.

Figure 2:
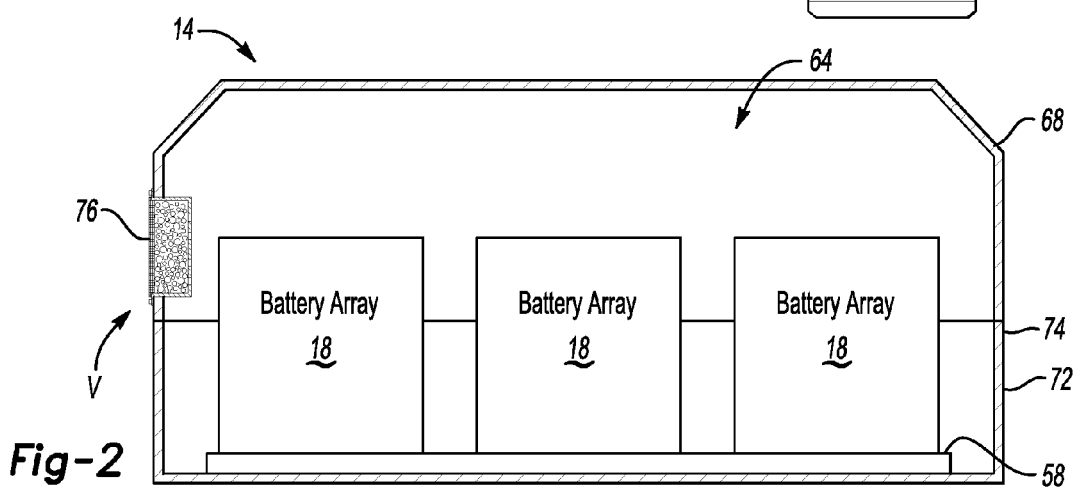
FIG. 2 shows a partially schematic view of a battery pack from the powertrain of FIG. 1 with selected portions removed to reveal a plurality of battery arrays.

Referring now to FIG. 2, the battery arrays 18 are disposed on a heat exchanger plate 58 within an interior 64 of the battery pack 14. The heat exchanger plate 58 is a cold plate in this example. Coolant can circulate through a coolant path in the heat exchanger plate 58 to remove thermal energy from the battery pack 14.

An upper housing 68 and a lower housing 72 are joined at an interface 74 to provide the interior 64. A vent V permits a flow of air to move from an exterior of the battery pack 14 to the interior 64 and vice versa. The vent V is in the upper housing 68 in this example. The vent V could be in the lower housing 72, in a combination of the upper housing 68 and the lower housing 72, or in another area of the pack 14 that permits the flow between the interior 64 and the exterior of the battery pack 14.

The vent V enables a pressure in the interior 64 to equalize with a pressure outside the battery pack 14. The vent V further provides a path for gas to escape from cells within the battery arrays 18 if required.

Figure 3:
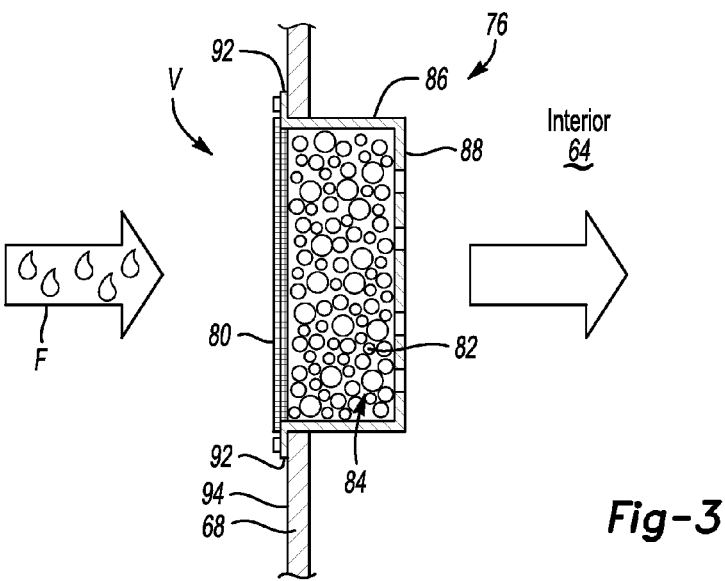
FIG. 3 shows a close-up view of a battery pack filtering device used in connection with the battery pack of FIG. 2.
Figure 4:
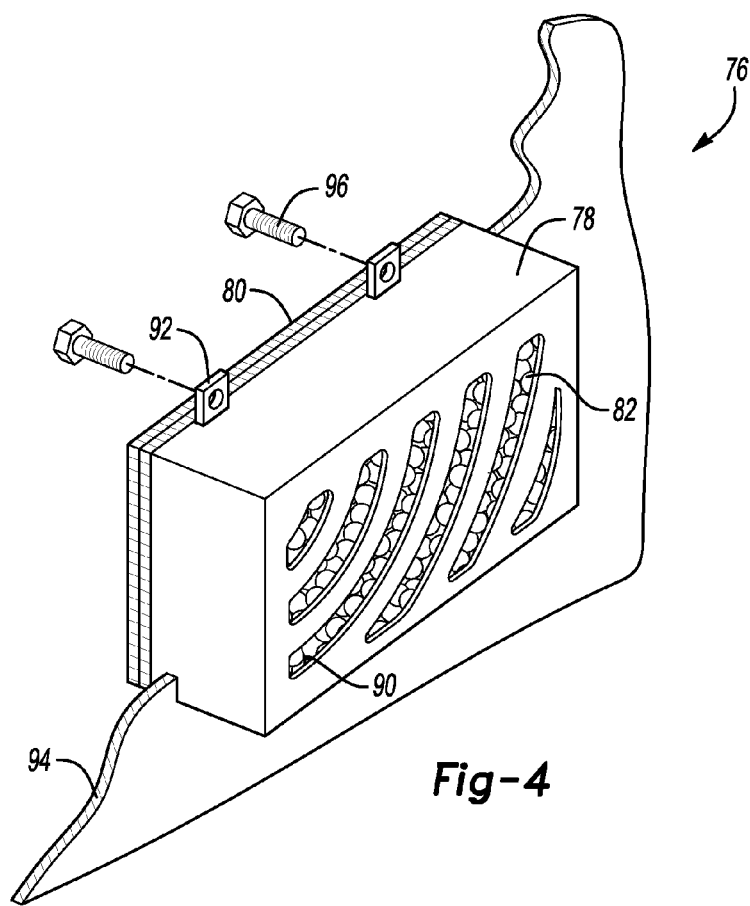
FIG. 4 shows a perspective view of the battery pack filtering device of FIG. 3 secured to a portion of the battery pack.
Figure 5:
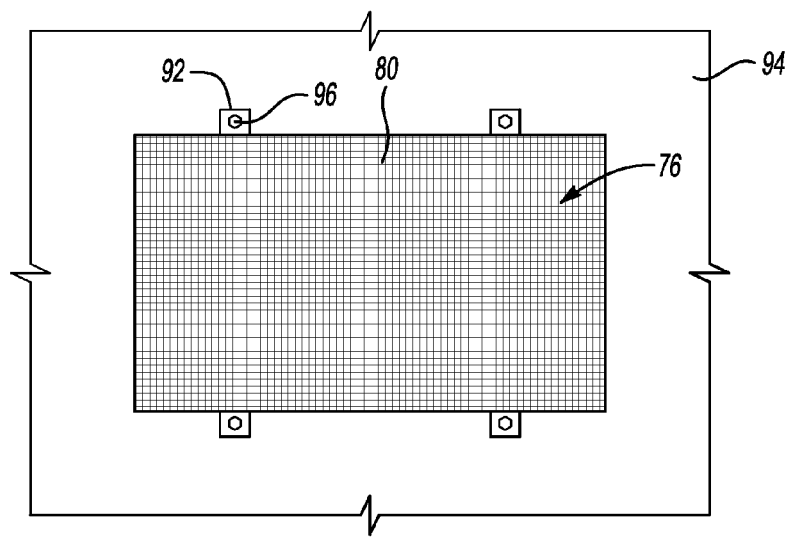
FIG. 5 shows a front view of the battery pack filtering device of FIG. 3 in an installed position within the battery pack of FIG. 2.

Referring now to FIGS. 3 to 5 with continuing reference to FIG. 2, in this example, a flow F of air can move from the interior to the exterior through the vent V. The example battery pack 14 is positioned within an electrified vehicle outside a passenger compartment. The flow F thus can potentially include water vapor and liquid water, which, if not blocked, can enter the interior 64 through the vent V and undesirably contact the battery arrays 18 and other components within the interior 64.

A battery pack filtering device 76 is positioned within the vent V to filter the flow F. The battery pack filtering device 76 removes at least some water vapor and at least some liquid water from the flow F. Accordingly, flow F that has moved through the battery pack filtering device 76 to the interior 64 contains less water vapor and less liquid water than flow F outside the interior 64.

The example battery pack filtering device 76 includes a frame 78, a desiccant 82, and a membrane 80. The membrane 80 can block liquid water. The desiccant 82 can adsorb water vapor that has passed through the membrane 80.

The example frame 78 is a polymer material. In another example, the frame 78 is constructed from some other type of material, such as a metallic material.

The frame 78 includes an open area 84 that, in this example, is provided by walls 86 extending upwardly from a floor 88 of the frame 78. The open area 84 holds the desiccant 82.

The floor 88 includes a plurality of openings 90. The openings 90 together with the open area 84 provide passageways that permit the flow F to move through the vent V. The openings 90 are shown in the floor 88, but in other examples could instead, or in addition, be located within the walls 86.

The membrane 80 can be secured to the frame 78 utilizing adhesive, tape, or another type of attachment feature. The membrane 80 is attached to the frame 78 such that all, or substantially all, flow F communicating through the open area 84 and the openings 90 to the interior 64 passes through the membrane 80.

The membrane 80 blocks liquid water within the flow F from entering the interior 64. The example membrane 80 is a polytetrafluoroethylene membrane, such as a polytetrafluoroethylene membrane sold under the trademark GORE-TEX™.

The example membrane 80 is in direct contact with the desiccant 82 contained within the open area 84. In another example, a spacer, such as another layer of material, prevents the desiccant 82 from directly contacting the membrane 80.

Although the membrane 80 repels liquid water, water vapor can potentially move past the membrane 80 into the open area 84 and, if not for the desiccant 82, through the openings 90 into the interior 64.

Water vapor within the interior 64 can condense to liquid water during temperature swings, which can potentially negatively impact components within the interior 64.

The desiccant 82 adsorbs water vapor that has penetrated the membrane 80. The desiccant 82 thus facilitates removing even more water from the flow F moving through the vent V than if the membrane 80 was used without the desiccant 82.

The desiccant 82 can be crystals, powder, or some combination of these. The desiccant material can be silica in some examples. The openings 90 are sized to block the desiccant 82 from falling outside the open area 84 through the openings 90.

In some examples, the desiccant 82 could be contained within a perforated pouch or container that is inserted within the frame 78. The perforated pouch or container prevents the desiccant 82 from moving from the open area 84 through the openings 90.

In another example, the desiccant 82 is placed within the open area 84. The membrane 80 is then secured to the frame 78 and extends to cover the openings 90. The membrane 80, in such the example, holds the desiccant 82 within the open area 84.

The exemplary battery pack filtering device 76 includes tabs 92 about its perimeter that can be secured to an exteriorly facing surface 94 of the upper housing 68 using, for example, mechanical fasteners 96.

Over time, the desiccant 82 may have a reduced effectiveness due to the adsorption of water vapor. Thus, replacing at least the desiccant 82 within the frame 78 can be desired.

To replace the desiccant 82, the mechanical fasteners 96 are removed and the battery pack filtering device 76 is then withdrawn from the vent V so that the desiccant 82 can be accessed and replaced.

Notably, the membrane 80 is upstream from the desiccant 84 relative to the direction of flow F through the vent V into the interior 64. This positioning facilitates the effectiveness of the desiccant 84 because the desiccant 84 adsorbs water vapor after the flow F has passed through the membrane 80 and has a reduced quantity of liquid water.

Figure 6:
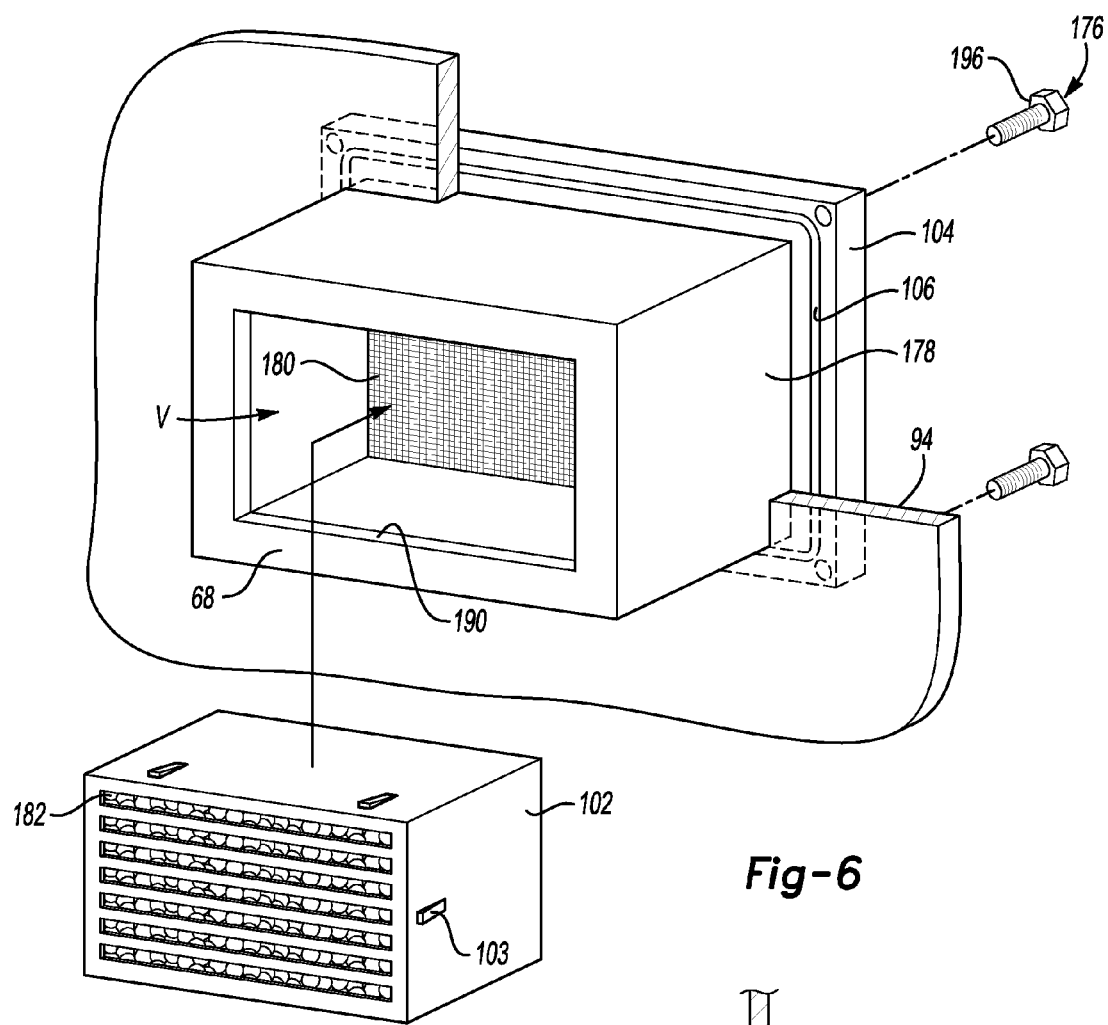
FIG. 6 shows a perspective view of another example battery pack filtering device with a filter cartridge removed.

Referring now to FIG. 6, another example battery pack filtering device 176 includes a frame 178, a membrane 180, and a desiccant 182.

The desiccant 182 of the filtering device 176 is held within a cartridge 102. The housing 178 includes an outwardly extending flange 104 that is secured to the surface 94 of the upper housing 68.

A seal 106 extends about the vent V on an underside of the flange 104. The seal 106 contacts the surface 94 to ensure airflow moving through the vent V to the passageway moves through the membrane 180.

An opening 190 in the frame 178 receives the cartridge 102 and provides a portion of the passageway for flow through the battery pack filtering device 176.

Clips 103 extending from outwardly facing sides of the cartridge 102 can secure the cartridge 102 within the frame 178. A gasket (not shown) could be used to seat areas between the cartridge 102 and other areas of the frame 178.

If replacing the desiccant 182 in the battery pack filtering device 176 is desired, mechanical fasteners 196 that secure the battery pack filtering device 176 to the surface 94 can be removed so that the battery pack filtering device 176 can be withdrawn from the vent V. The cartridge 102 can then be removed and replaced with a replacement cartridge. The cartridge 102 may be removed and replaced at specific service intervals corresponding to a particular time and service for the battery pack 14, for example.

In some examples, the membrane 180 could be secured to a surface of the cartridge 102 rather than the frame 178. In such examples, the membrane 180 can be removable together with the cartridge 102.

Figure 7:
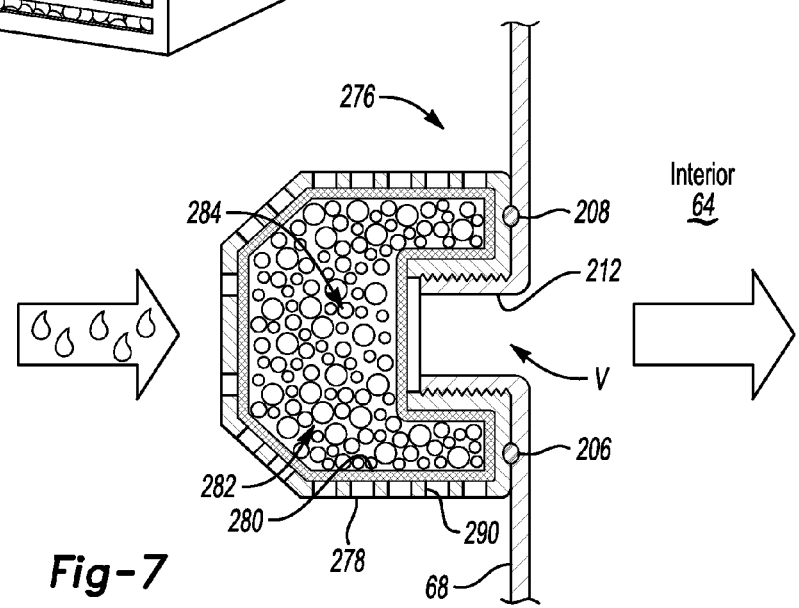
FIG. 7 shows a section view of yet another example battery pack filtering device.
Figure 8:
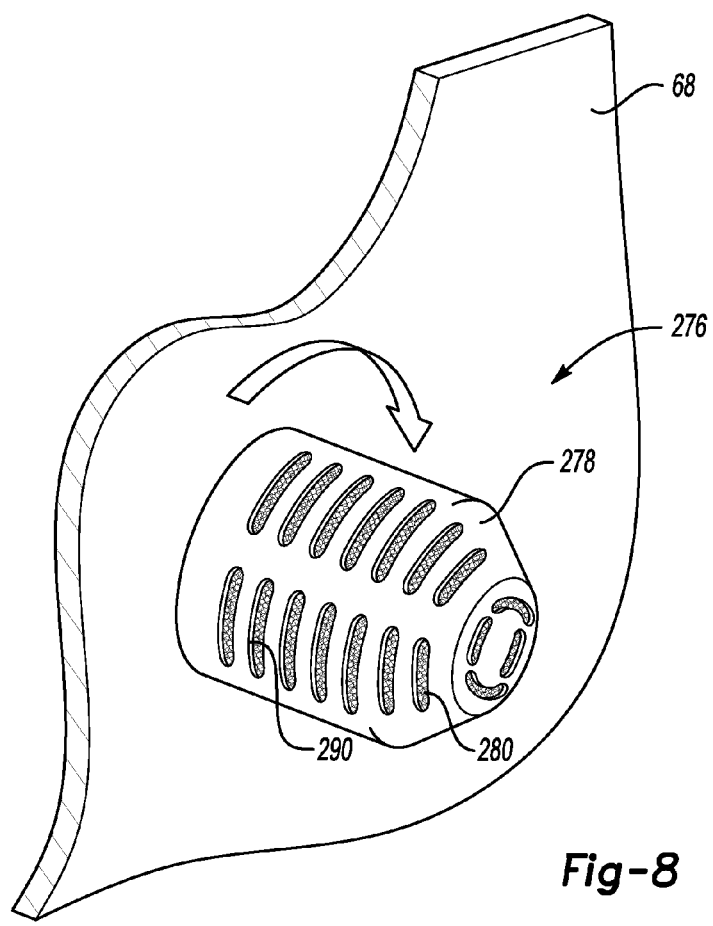
FIG. 8 shows a perspective view of the battery pack filtering device of FIG. 7 secured to a portion of a battery pack.
Figure 9:
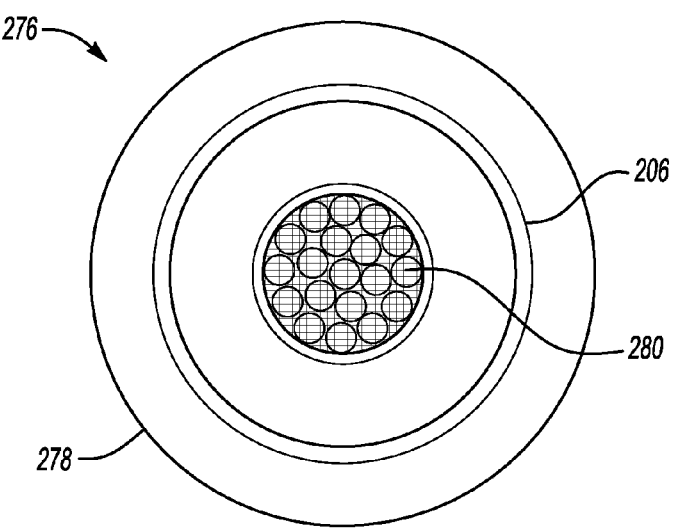
FIG. 9 shows a bottom view of the battery pack filtering device of FIG. 7 when removed from the battery pack.

Referring now to FIGS. 7 to 9, another example battery pack filtering device 276 includes a frame 278, a membrane 280, and a desiccant 282. The membrane 280 lines an interiorly facing surface of the frame 278 and, specifically, an open area 284 provided by the frame 278 that receives the desiccant 282. The frame 278 includes openings 290 to permit flow to and from the open area 284.

Because the membrane 280 lines the interiorly facing surface of the frame 278 and extends across the openings 290, flow entering the openings 290 passes through the membrane 280 before contacting the desiccant 282. The example membrane 280 surrounds the desiccant 282 within the open area 284.

The example battery pack filtering device 276 includes integrated features to attach the battery pack filtering device 276 to the upper housing 68. In this example, the frame 278 provides a female threaded connection 208 that receives a male threaded connection 212 of the upper housing 68. In another example, the frame 278 includes the male threaded connection and the upper housing 68 provides the female threaded connection.

The threaded connections 208 and 212 each provide a bore. When the connection 208 is threadably secured to the connection 212, flow can move from the open area 284 through the membrane 280 and into the interior 64.

A seal 206 blocks flow that has not passed through the membrane 280 into the open area 284 from entering the interior 64 through the vent V.

The battery pack filtering device 276 can be removed by rotating the battery pack filtering device 276 to uncouple the threaded connection 208 from the threaded connection 212. The battery pack filtering device 276 can then be replaced or repaired.

Figure 10:
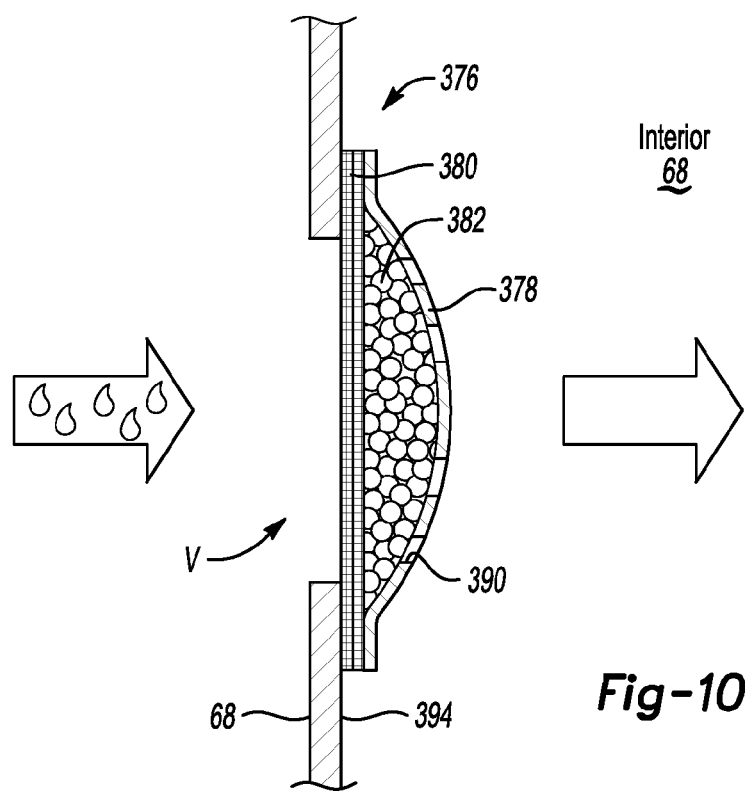
FIG. 10 shows a section view of still another example battery pack filtering device.

Referring now to FIG. 10, another example battery pack filtering device 376 includes a frame 378, a membrane 380, and a desiccant 382. Outer peripheral edges of the housing 378 are secured to the membrane 380, which is then secured to an inwardly facing surface 394 of the upper housing 68. The securing of the frame 378, the membrane 380, and the surface 394 can be adhesive or can involve mechanical fasteners, or some other type of attachment mechanism.

The membrane 380 spans across the vent V in the upper housing 68. Thus, flow entering the vent V passes through the membrane 380. The frame 378 is secured to the membrane 380 such that the frame 378 holds the desiccant 382 against the membrane 380. Flow that has moved through the vent V through the membrane 380 passes through the desiccant 382, through openings 390 in the frame, and to the interior 64.

Figure 11:
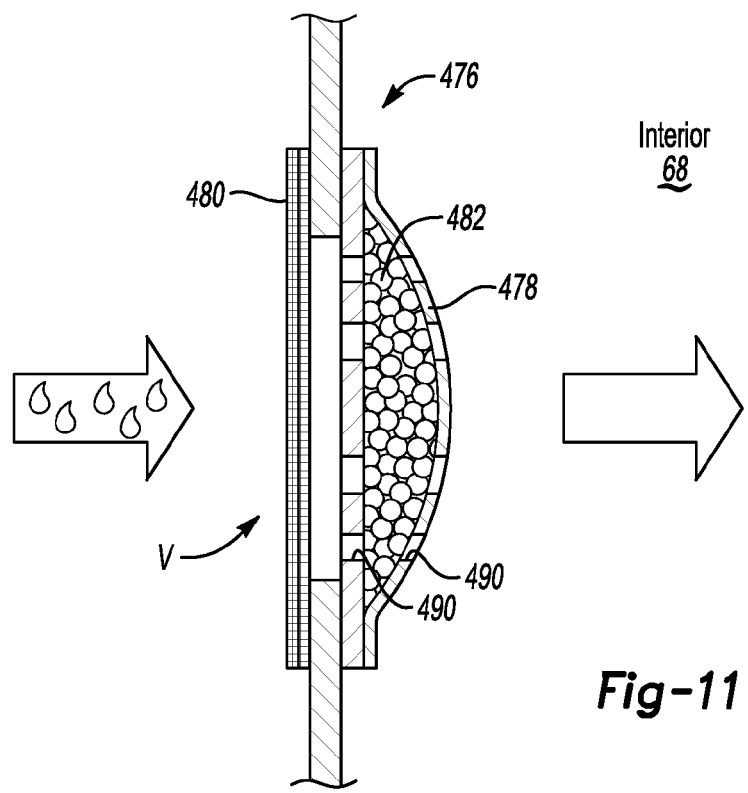
FIG. 11 shows a section view of still another example battery pack filtering device.

Referring now to FIG. 11, yet another example battery pack filtering device 476 includes a frame 478, a membrane 480, and a desiccant 482. In this example, the frame 478 holds the desiccant, and the membrane 480 is spaced from the frame 478. The frame 478 and the desiccant 482 are in the interior 64. The membrane 480 by contrast, is on the exterior.

The membrane 480 covers the vent V such that flow moving through the vent V passes through the membrane 480. Flow then moves through openings 490 in the frame 478 through desiccant 482, and exits through openings 490 in the frame 478.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. A battery pack filtering device, comprising:
   a frame that provides at least one passageway to communicate air through the frame to an interior of a battery pack;
   a desiccant held by the frame; and
   a membrane configured to block liquid that is outside the interior from communicating through the at least one passageway to the interior and to the desiccant.

2. The battery pack filtering device of claim 1, wherein the desiccant directly contacts the membrane.

3. The battery pack filtering device of claim 1, wherein the membrane is directly secured to the frame.

4. The battery pack filtering device of claim 1, wherein the membrane is permeable to water vapor and repels liquid water.

5. The battery pack filtering device of claim 1, further comprising a seal at an interface between the frame and a wall of the battery pack.

6. The battery pack assembly of claim 1, further comprising a threaded connector to secure the frame relative to the battery pack.

7. The battery pack filtering device of claim 6, wherein the threaded connector provides a portion of the passageway.

8. The battery pack filtering device of claim 1, wherein at least one of the membrane or the desiccant are outside the interior of the battery pack.

9. The battery pack filtering device of claim 1, wherein the membrane and the desiccant are inside the interior of the battery pack.

10. The battery pack filtering device of claim 1, wherein the frame is dome-shaped.

11. The battery pack filtering device of claim 1, wherein the at least one passageway communicates air along a direction of flow to the interior, and the membrane is upstream from the desiccant relative to the direction of flow.

12. A battery pack assembly, comprising:
    a housing having an interior area that contains at least one battery array of an electric vehicle; and
    a filtering device received within a vent of the housing;
    a membrane of the filter that blocks movement of liquid to the interior area through the vent;
    a desiccant of the filter that adsorbs water vapor, the membrane upstream from the desiccant relative to a direction of flow through the vent to the interior area.

13. The battery pack assembly of claim 12, wherein the filter is removeably attachable to the housing.

14. The battery pack assembly of claim 12, wherein the vent is configured to communicate air to and from the interior area to equalize a pressure of the interior area with a pressure outside the housing.

15. A method of equalizing pressure in a battery, comprising:
    communicating a flow of air through a passageway in a frame to an interior of a battery pack;
    blocking movement of at least some liquid through the passageway using a membrane;
    and adsorbing at least some water vapor in the passageway with a desiccant,
    the membrane upstream from the desiccant relative to the flow of air communicating to the interior of the battery pack.

16. The method of claim 15, further comprising directly contacting the membrane with the desiccant.

17. The method of claim 15, wherein the frame is removeably attachable to a housing of the battery pack.

18. The method of claim 15, wherein the passageway comprises a plurality of apertures in the frame.

19. The method of claim 15, wherein the desiccant and the membrane are outside the interior.

20. The method of claim 15, wherein the water vapor adsorbed by the desiccant is water vapor that has passed through the membrane.

* * * * *

UNITED STATES PATENT AND TRADEMARK OFFICE
CERTIFICATE OF CORRECTION

PATENT NO. : 9,627,666 B2  
APPLICATION NO. : 14/742654  
DATED : April 18, 2017  
INVENTOR(S) : Christopher Steven Baldwin Page 1 of 1

It is certified that error appears in the above-identified patent and that said Letters Patent is hereby corrected as shown below:

On the Title Page

Item (73), Assignee; after "Global" replace "Technology" with --Technologies--

Signed and Sealed this  
First Day of August, 2017

Joseph Matal  
*Performing the Functions and Duties of the*  
*Under Secretary of Commerce for Intellectual Property and*  
*Director of the United States Patent and Trademark Office*